Patented Dec. 4, 1945

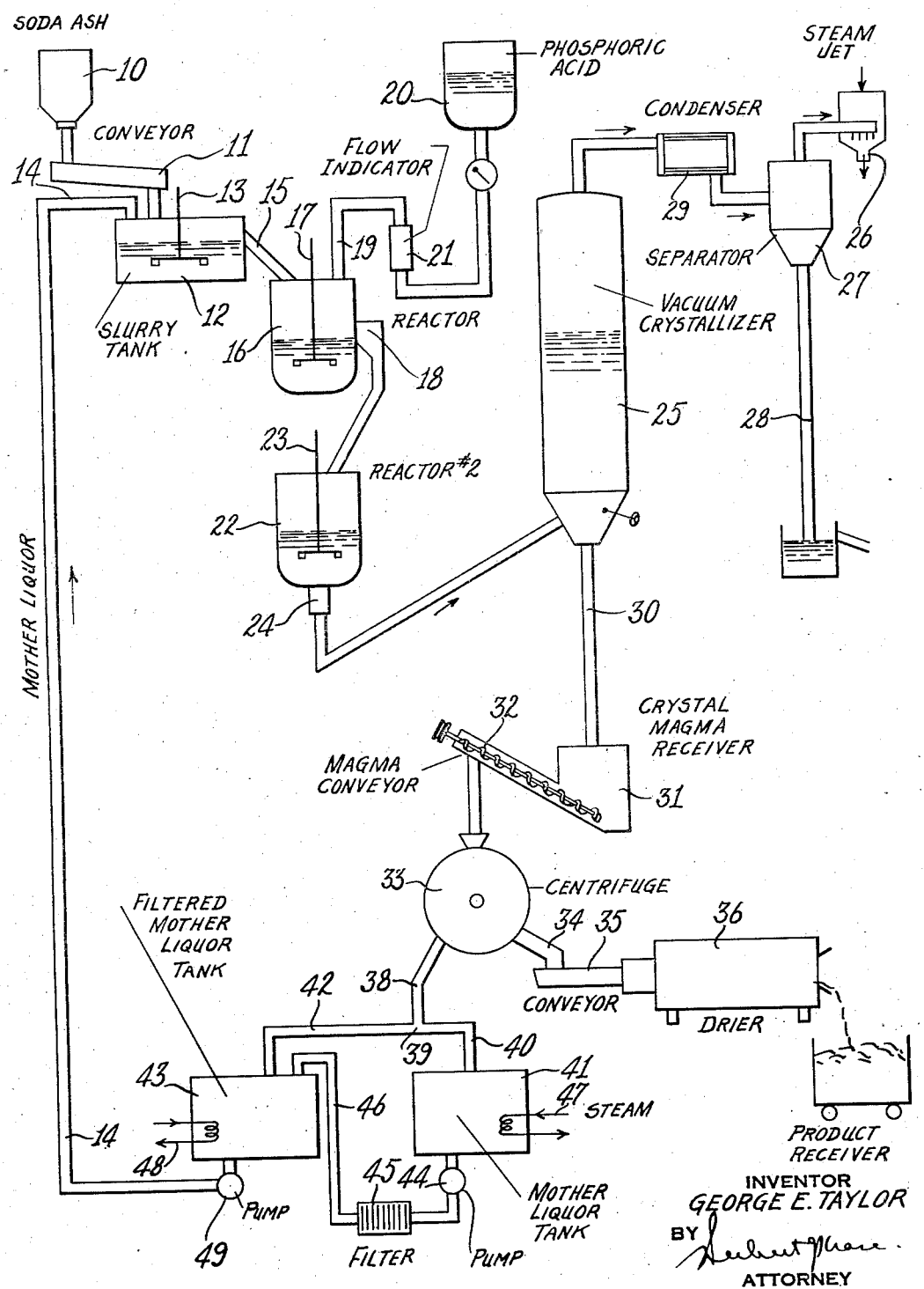

2,390,400

UNITED STATES PATENT OFFICE 2,390,400

PRODUCTION OF SODIUM PHOSPHATES

George E. Taylor, Anniston, Ala., assignor to Monsanto Chemical Company, a corporation of Delaware Application June 26, 1942, Serial No. 448,529

8 Claims. (Cl. 23—107)

This invention relates to a process for producing sodium phosphates in a continuous manner.

In previous processes for producing sodium phosphates it has been customary to react together soda ash and phosphoric acid in batch equipment, with extended boiling out of carbon dioxide, which operation made necessary the separate adjustment of each batch to the desired end point. After the separate batches had been completely reacted and the last adjustments, i. e., the acid and the alkali had been balanced at the desired end point, the resulting solution was filtered and subjected to crystallization or further treatment as desired.

In the present process I provide means whereby soda ash and phosphoric acid may be continuously reacted in the proportions approximating disodium orthophosphate without the necessity of achieving an accurate adjustment of the alkali and acid constituents of the mixture and without carrying to completion the reaction of soda ash and acid in respect to the contained carbon dioxide. Thus the present process is based in part upon a realization that a continuously circulating mother liquor may be flowed through a succession of zones in which, first a quantity of soda ash may be slurried therewith to produce a flowable slurry without difficulty of lump formation, after which, in another zone the calculated quantity of phosphoric acid may be added thereto to produce substantially disodium phosphate with said ash, after which by detaining the solution in a further zone for a period of time and at a temperature below the boiling point the reaction would progress to a point short of complete reaction. From such an incompletely reacted solution crystals may then be deposited by ordinary cooling or advantageously by evaporative cooling, which crystals thus produced comprise a pure disodium orthophosphate dihydrate of such size that they may readily be separated from their mother liquor, which liquor is then returned for the production of additional slurry.

By working under conditions such that an incomplete reaction, as measured by contained carbon dioxide in the solution, is maintained, a considerable saving in heat is realized. A further saving in heat results from the fact that the mother liquor may be maintained at a temperature of not lower than the lower range stability of the dihydrate of disodium phosphate (48.1° C.) or for practical reasons not lower than say 50° C. to 75° C. when employing the present process a steam consumption of less than 25% of that required in the older processes is realized.

The present process is further based in part upon the discovery that disodium phosphate dihydrate may be crystallized from mother liquor containing as high as 1% or more of carbon dioxide (corresponding to solutions in which approximately one-twentieth of the disodium orthophosphate has been neutralized by carbon dioxide to form monosodium orthophosphate) and crystals obtained containing from 0.01% to 0.05% of carbon dioxide.

The present process is also based in part upon the discovery that evaporative cooling may be employed for crystallizing purposes, according to which the crystallizing solution is subjected to a vacuum, serving not only to accelerate the evaporation of water but also to withdraw considerable quantities of carbon dioxide from the solution. The withdrawal of dissolved carbon dioxide as well as water from the crystallizing solution effects cooling and promotes crystallization of the desired dihydrate.

In some cases, particularly when employing some types of soda ash, a build-up of foam producing impurities takes place in the constantly circulated mother liquor. If allowed to accumulate in the mother liquor, foaming occurs in the vacuum crystallizer to such an extent as to seriously interfere with the operation thereof. In such cases, I have found that the continuous treatment of a portion of the mother liquor, say 10% to 50% with activated carbon results in keeping the foaming impurities at a sufficiently low level in the mother liquor that serious foaming in the vacuum crystallizer is no longer encountered.

Evaporative cooling in the cycle of operations herein provided is advantageous not only because it eliminates considerable quantities of carbon dioxide from the mother liquor but also because it evaporates some of the water therefrom, thus increasing the concentration of the crystallizing solution. It is also advantageous because cooling of the solution may be restricted to higher mother liquor temperatures, desirably above 50° C. and preferably above 70 or 75° C., whereby considerably smaller amounts of heat are required in again raising the temperature of the mother liquor to the range wherein saturation with disodium phosphate is accomplished.

According to the present process ordinary commercial soda ash is continuously slurried with mother liquor from which disodium phosphate dihydrate has been crystallized. The proportions employed are such as to produce a flowable slurry and to prevent lumps of partly hydrated soda ash from being formed. A suitable slurry may be formed by employing about 1½ gallons of mother liquor per pound of soda ash. The slurry is then flowed to a reactor to which phosphoric acid is added and wherein the temperature is maintained above about 95° C. but below the boiling point. In this first reactor a partial reaction of acid and soda ash is effected with the liberation of part of the carbon dioxide present. The liquor thus produced is a solution of disodium phosphate containing dissolved sodium bicarbonate and monosodium orthophosphate.

The liquor produced in the first reactor is thereupon passed to a second reactor, maintained at a temperature of above 85° C., i. e., preferably in the range of 85° C. to 87° C. The solution in the second reactor is maintained at such a concentration as to be saturated at about 85° C. Such a solution has a gravity of about 1.548 at 100° C. In this second reactor a further liberation of carbon dioxide takes place by the reaction together of the dissolved monosodium orthophosphate and the sodium bicarbonate. In order to obtain a true solution in the second reactor, which solution is saturated at 85° C., the proportions of mother liquor and soda ash fed to the first reactor should be about 1.2 to 1½ gallons of mother liquor per pound of soda ash fed.

The liquor leaving the second reactor is preferably only partly reacted, i. e., it contains some dissolved carbon dioxide as sodium bicarbonate and also some unreacted monosodium phosphate.

The solution thus prepared is then flowed to a continuous vacuum crystallizer wherein the solution is subjected to a vacuum and cooled due to the evaporation of water from the crystallizing solution. The vacuum is controlled to the extent that the temperature is maintained not below 50° C. and preferably in the range of from 65° C. to 75° C. In the vacuum crystallizer, the crystals are maintained in suspension by suitable agitators.

The crystal magma flows continuously from the vacuum crystallizer into a continuous centrifuge which serves to separate the suspended crystals from the mother liquor. The centrifuged crystals are then dried and consist of crystals of the compound $Na_2HPO_4.2H_2O$.

The motor liquor flowing from the centrifuge is filtered to the extent of approximately 30% of its volume by the addition of filter aids and the employment of an ordinary filter press. The temperature of the mother liquor is raised to approximately 90° C. to 95° C. by suitable heating means and at this point the mother liquor contains approximately from 0.3% to 1% by weight of dissolved carbon dioxide. This mother liquor is returned to the slurry tank first above mentioned, for the production of additional slurry in a continuous manner. Thus the process embodies a circulating mother liquor for carrying the reactance through the system.

The single figure in the drawing illustrates diagrammatically the flow sheet of the apparatus employed in my process. Referring to the drawing, numeral 10 indicates a soda ash container from which soda ash may be discharged at a constant regulated rate into a conveyor 11. The conveyor conveys the soda ash crystals into slurry tank 12, which is provided with a stirrer 13, and to which is supplied a contiguous stream of mother liquor by means of pipe 14. The slurry tank is also provided with an overflow connection 15, by means of which the slurry of soda ash and mother liquor therein produced is conveyed by gravity flow into reactor 16. Reactor 16 is also provided with the stirring mechanism 17 and overflow device 18, and is also supplied with a constant source of phosphoric acid entering by means of pipe 19. Pipe 19 connects with the phosphoric acid storage tank 20 through a flow indicator 21. A 75% orthophosphoric acid is preferred for this purpose but the process may also be carried out with weaker (say 60%) or stronger (up to 85%) acid.

The soda ash dissolved in the mother liquor reacts with the phosphoric acid in reactor 16, the reactor being so proportioned as to provide a time of sojourn therein of from 4 to 10 minutes. Ordinarily this reaction takes place to the extent of 60% to 70% of completion at this point. Lack of attaining completeness of reaction is manifested by a content of carbon dioxide in the liquor discharged from the reactor of approximately 1% $CO_2$. Control of addition of the correct amount of acid to the soda ash slurry is effected by a titration method. For this purpose samples of liquor leaving the first reactor are withdrawn and 5 cc. of the solution diluted to 100 cc. with water, 50 cc. of $N/2H_2SO_4$ added and the sample boiled to eliminate $CO_2$. The sample is cooled and then titrated with $N/2NaOH$ solution to the disodium phosphate end point. The "titre" is expressed as c.c.'s of $N/2NaOH$ solution thus required. When the $Na_2O$ and the $P_2O_5$ in the solution is equivalent to that contained in disodium phosphate the "titre" is 50 cc. For the purposes of producing a high grade product the titres should be held within the range of 51 to 52 cc.

Titres below 50 result in a product with a pH above 9.0 and indicate $CO_2$ present. Titres of 53 cc. and above tend to lower the pH of the product to 8.8 and below. The pH of the product as determined by measuring the pH of a 1% solution thereof in water is desirably maintained at 8.8 or 8.9 or even 9.0 for most purposes.

The partially reacted liquor leaving reactor 16 by means of pipe 18 flows through a continuation of pipe 18 into reactor 22, which reactor is likewise provided with a stirrer 23. The contents of reactor 22 are preferably permitted to remain therein for an average time of sojourn of from 12 to 30 minutes. The liquid contents of this reactor are continuously removed therefrom by flowing through pipe 24, and by a continuation thereof caused to flow into vacuum crystallizer 25. In crystallizer 25 the solution at a temperature in the neighborhood of 95° C. is dropped in temperature to as low as 65° C. to 75° C. by the evaporation of water and the elimination of carbon dioxide caused by the partial vacuum therein. Such partial vacuum is most conveniently attained by means of a steam jet 26 and separator 27 which is provided with a barometric leg 28, which combination serves to draw the vapors through condenser 29, wherein any water vapor present is condensed.

The vacuum crystallizer 25 operates continuously, it being supplied continuously with a solution flowing through pipe 24 and continuously discharging a cooled crystal magma by gravity flow from the bottom thereof through pipe 30. Pipe 30 also serves as a barometric leg and permits the slurry of crystals and mother liquor to flow continuously from crystallizer 25 into a crystal magma receiver 31.

The crystals and mother liquor in which they are suspended at this point are continuously removed from the receiver 31 by means of screw conveyor 32 and are discharged into a continuous centrifuge 33 for the purpose of de-watering the crystals.

As a result of the centrifugal action of the centrifuge, de-watered crystals are discharged through pipe 34 into conveyor 35 by means of which they are conveyed into hot air drier 36. At this point they are dried superficially by contact with air at not too great a temperature, and thereafter discharged into a suitable product receiver as dihydrated sodium phosphate

(Na₂HPO₄.2H₂O)

Returning to the mother liquor leaving centrifuge 33 by means of pipe 38, the flow of mother liquor is divided into two portions at the point 39. The first portion may flow by means of pipe 40 into mother liquor tank 41, while the second portion and remainder thereof flows by means of pipe 42 into mother liquor tank 43. The division of mother liquor at this point is dictated by the necessity of filtering part thereof; hence that part conveyed to mother liquor tank 41 is removed therefrom by pump 44, passed through filter 45 and then passed to tank 43 by means of pipe 46.

Both tanks 41 and 43 are provided with steam heating coils, numbered respectively 47 and 48. The purpose of the heating coils is to raise the temperature of the mother liquor to a point sufficiently high, say 90° C. to 95° C. so that crystal formation will not take place during filtration or further handling thereof.

From mother liquor tank 43 mother liquor is constantly withdrawn by means of pump 49 and conveyed by means of pipe 14 back to slurry tank 12, thus completing the circuit.

As ordinarily operated, utilizing commercial soda ash and phosphoric acid, a gradual accumulation of what I believe to be organic matter takes place in the circulating liquors, which I have found may lead to serious foaming in the vacuum crystallizer. In order to overcome such foaming tendencies, I have found that I may treat from 25% to 50% of the mother liquor during filtration in filter 45 by means of an activated carbon. The function of the activated carbon is to remove by absorption the matter responsible for foaming in the crystallizer from the solution, thus overcoming any foaming tendency in the vacuum crystallizer. In order to treat a part of the mother liquor with activated carbon, I add such activated carbon directly to mother liquor tank 41, convey the liquor by means of pump 44 to filter 45, where it is removed as a solid upon the filter medium therein. With ordinary commercial grades of soda ash, as at present available, I find that a filtration and treatment of approximately 25% of the mother liquor discharged by the centrifuge is sufficient to remove enough of the organic matter to cause no serious difficulty in foaming in the crystallizer. The division of mother liquor is made at point 39 by means of the suitable regulation of a valve situated at this point.

Inorganic impurities such as calcium, aluminum, iron, etc., also will accumulate in the circulating mother liquor, and will tend to coagulate during sojourn of the mother liquor in tank 41. They may be removed by filtration of the solution in filter 45 using ordinary filter aids.

What I claim is:

1. A continuous process for making disodium phosphate dihydrate which comprises preparing a flowable slurry of soda ash in disodium phosphate mother liquor, introducing said slurry into a reactor maintained above 95° C. but below the boiling point of the slurry, adding phosphoric acid to said slurry to partially react with the soda ash to liberate a portion of the carbon dioxide and to form a liquor containing disodium phosphate, sodium bicarbonate and monosodium phosphate, flowing said liquor to a second reactor maintained at a temperature of about 85° C. where a partial reaction between the monosodium phosphate and sodium bicarbonate occurs thus liberating additional quantities of carbon dioxide and leaving some unreacted sodium bicarbonate and monosodium orthophosphate in solution in the mother liquor, introducing the mother liquor thus produced into a continuous vacuum crystallizer maintained at a temperature of from 50 to 75° C. to form a crystal magma, flowing said magma to a centrifuge to separate the crystals from the mother liquor, treating a portion of said mother liquor with an adsorbent material to remove foam producing impurities, filtering and combining said treated liquor with the untreated mother liquor, reheating the combined mother liquors to a temperature of from 90 to 95° C. and then continuously returning the reheated mother liquor to the first step of the process where it is mixed with soda ash to form additional quantities of slurry.

2. A continuous process for making disodium phosphate dihydrate which comprises preparing a flowable slurry of soda ash in disodium phosphate mother liquor, introducing said slurry into a reactor maintained above 95° C. but below the boiling point of the slurry, adding phosphoric acid to said slurry to partially react with the soda ash to liberate a portion of the carbon dioxide and to form a liquor containing disodium phosphate, sodium bicarbonate and monosodium phosphate, flowing said liquor to a second reactor maintained at a temperature of about 85° C. where a partial reaction between the monosodium phosphate and sodium bicarbonate occurs thus liberating additional quantities of carbon dioxide and leaving some unreacted sodium bicarbonate and monosodium orthophosphate in solution in the mother liquor, introducing the mother liquor thus produced into a continuous vacuum crystallizer maintained at a temperature of from 65 to 75° C. to form a crystal magma, flowing said magma to a centrifuge to separate the crystals from the mother liquor, treating a portion of said mother liquor with activated carbon to remove foam producing impurities, filtering and combining said treated mother liquor with the untreated mother liquor, reheating the combined mother liquors to a temperature of from 90 to 95° C. and then continuously returning the reheated mother liquor to the first step of the process where it is mixed with soda ash to form additional quantities of slurry.

3. A continuous process for making disodium phosphate dihydrate which comprises preparing a flowable slurry of soda ash in disodium phosphate mother liquor, introducing said slurry into a reactor maintained above 95° C. but below the boiling point of the slurry, adding phosphoric acid to said slurry to partially react with the soda ash to liberate a portion of the carbon dioxide and to form a liquor containing disodium phosphate, sodium bicarbonate and monosodium phosphate, flowing said liquor to a second reactor maintained at a temperature of about 85° C. where a partial reaction between the monosodium phosphate and sodium bicarbonate occurs thus liberating additional quantities of carbon dioxide and leaving some unreacted sodium bicarbonate and monosodium phosphate in solution in the mother liquor, introducing said mother liquor into a continuous vacuum crystallizer maintained at a temperature of from 70 to 85° C. to form a crystal magma, flowing said magma to a centrifuge to separate the crystals from the mother liquor, treating a portion of said mother liquor with activated carbon to remove foam producing impurities, filtering and combining said treated mother liquor with the untreated mother liquor, reheating the combined mother liquors to a temperature of from 90 to 95° C. and then continuously returning the reheated mother liquor to the first step of the process where it is mixed with soda ash to form additional quantities of slurry.

4. The process defined in claim 3 in which the slurry is produced by mixing dry soda ash with disodium phosphate mother liquor in the proportions of one pound of dry soda ash to between 1.2 gallons and 1.5 gallons of mother liquor.

5. The process defined in claim 3 wherein the reaction taking place in the first reactor is permitted to proceed for a period of from 4 to 10 minutes.

6. The process defined in claim 3 wherein the reaction taking place in the second reactor is permitted to proceed for a period of from 12 to 30 minutes.

7. The process defined in claim 3 wherein from 25 to 50% of the mother liquor is treated with an adsorbent to remove foam producing impurities.

8. The process defined in claim 3 wherein phosphoric acid is added to the soda ash slurry in an amount yielding, in the absence of dissolved $CO_2$, a $P_2O_5$–$Na_2O$ ratio in the mother liquor flowing from the first reactor such that 5 c.c. of said liquor is on the acid side of the disodium phosphate end point by an amount equivalent to from 1 to 3 c.c. of N/2 alkali.

GEO. E. TAYLOR.